United States Patent
Umehira et al.

(10) Patent No.: US 6,188,697 B1
(45) Date of Patent: Feb. 13, 2001

(54) ATM CELL TRANSPORT SYSTEM FOR WIRELESS COMMUNICATIONS

(75) Inventors: Masahiro Umehira, Yokohama; Hijin Satoh, Yokosuka; Takatoshi Sugiyama; Atsushi Ohta, both of Yokohama; Yuichi Sagawa, Yokosuka, all of (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 08/864,783

(22) Filed: May 29, 1997

(30) Foreign Application Priority Data

May 29, 1996 (JP) .................................................. 8/135388

(51) Int. Cl.[7] .................................................. H04L 12/56
(52) U.S. Cl. ............................................ 370/412; 370/395
(58) Field of Search .................................... 370/412, 395, 370/428, 429, 229, 230, 235, 236, 231, 232, 233, 234, 336, 337, 396, 397, 392, 413–418

(56) References Cited

U.S. PATENT DOCUMENTS

| | | | |
|---|---|---|---|
| 5,487,061 | * | 1/1996 | Bray ........................................ 370/13 |
| 5,497,371 | * | 3/1996 | Ellis et al. ............................... 370/60 |
| 5,521,923 | * | 5/1996 | Willmann et al. .................... 370/94.1 |
| 5,535,202 | * | 7/1996 | Kondoh ............................... 370/60.1 |
| 5,550,823 | * | 8/1996 | Irie et al. ............................. 370/413 |
| 5,555,265 | * | 9/1996 | Kakuma et al. ...................... 370/395 |
| 5,684,791 | * | 11/1997 | Raychaudhuri et al. ............ 370/278 |
| 5,719,865 | * | 2/1998 | Sato ..................................... 370/395 |
| 5,768,273 | * | 6/1998 | Aznar et al. ......................... 370/395 |
| 5,793,747 | * | 8/1998 | Kline ................................... 370/230 |
| 5,818,818 | * | 10/1998 | Soumiya et al. ..................... 370/252 |
| 5,822,317 | * | 10/1998 | Shibata ................................ 370/474 |
| 5,828,653 | * | 10/1998 | Goss .................................... 370/230 |

\* cited by examiner

*Primary Examiner*—Ajit Patel
*Assistant Examiner*—Brian Nguyen
(74) *Attorney, Agent, or Firm*—Pillsbury Madison & Sutro LLP

(57) ABSTRACT

An asynchronous transfer mode ("ATM") cell transfer system in a wireless communication system provides quality classes that correspond to the amount of cell transfer delay allowed. Cells are classified according to a quality class and stored in buffers. The cells are read starting from the buffer for the quality class with the highest priority, and successively from buffers for quality classes of lower priority. Alternatively, if there is room in the output interval of cells of a higher priority quality class, cells of a lower quality class are inserted among these cells.

9 Claims, 14 Drawing Sheets

ATM CELL TRANSPORT SYSTEM FOR WIRELESS COMMUNICATIONS

CROSS REFERENCE TO RELATED APPLICATIONS

This application claims priority from Japanese Patent Application Number 8-135388 filed May 29, 1996, the contents of which are incorporated herein by reference.

BACKGROUND OF THE INVENTION

1. Field of the Invention

The present invention relates to asynchronous transfer mode (ATM) communications, and is suitable for cell transmission over wireless links. More specifically, the present invention relates to a technique for improving cell transfer delay and cell delay variation. Although the present invention has been developed for utilization in wireless communication, it is widely applicable to wired and other common communication systems.

In this specification, "cell delay variation" is defined as including the transfer delay between a source and a destination, and the variation in this transfer delay.

2. Description of Related Art

In view of the mobility offered by wireless communication systems, wireless ATM has recently been attracting attention. The aim of wireless ATM is to achieve a mobile communication service which provides seamless multimedia services by carrying out ATM cell transmission using wireless communication systems and integrating this with wired ATM communication systems based on optical fiber. To realize high frequency utilization efficiency, wireless ATM extracts only valid cells which contain significant information and transmits only these cells over wireless links.

A single ATM terminal generally has a plurality of connections, and different transmission quality characteristics, i.e., qualities of service (QoS), can be required by each connection. In general, there are stringent requirements on cell delay variation in Constant Bit Rate and Variable Bit Rate techniques, and on cell loss in Available Bit Rate and Unspecified Bit Rate techniques. In addition, the cell rate of ABR and UBR frequently fluctuates dynamically with time.

In FIG. 12, which serves to explain the allocation of bandwidth or time slots, time is plotted along the horizontal axis and cell rate along the vertical axis. In ATM communication systems, transmission speed (number of cells/second) is generally defined in terms of a peak value (the peak cell rate) and an average value (the average cell rate) for each connection. A difference between the peak and the average values means that the transmission speed is fluctuating. Similarly, a permissible cell delay variation (in seconds) is provided for each connection. A quality class, therefore, has to be provided in correspondence with each of these quality requirements, and bandwidth or time slots have to be allocated to each quality class.

However, if too many quality classes are provided, control of the quality class in the network becomes complicated. Studies are currently being made of classifying cell delay variation, for example, into a class for which a cell delay variation of 3 ms or less is required, and a class for which there is no required value for cell delay variation. Transmission speed will also generally fluctuate in connection with a quality class for which there is no required value for cell delay variation.

An explanation will be given here of the case where there are two quality classes for cell delay variation. Namely, it will be assumed that there are the following two quality classes: quality class 1 in which a high quality is required for cell delay variation, and quality class 2 in which there are no quality requirements for cell delay variation. Letting the total of the maximum cell rates (number of cells/second) for connections of quality class 1 be R1, the total of the average cell rates for connections of quality class 2 be R2, and the total of the maximum cell rates for connections of quality class 2 be R3, time slots or bandwidth will be allocated in accordance with a transmission cell rate equivalent to the sum of cell rates R1 and R4, where $R2 \leq R4 \leq R3$. If R4 is set to R3, then although it will be possible to transfer ATM cells with a small cell delay variation irrespective of quality class, there will be a large bandwidth or time slot requirement. On the other hand, if R4 is set to R2, then efficient use can be made of time slots or bandwidth, and in a wireless ATM system, in particular, efficient use can be made of frequency. However, if the transmission cell rate fluctuates in connections of quality class 2, connections of quality class 1 will also experience cell delay variation with a resultant deterioration of quality.

In FIG. 13, which shows the relation between input cells 50 and output cells 52 in a prior art example, 15 time slots 54 are provided in every period T, and there is a mixture of cells of quality class 1 (56) and quality class 2 (58) and idle cells 59 (if necessary). In addition, there are 6 time slots 60 provided in each period T in the transmission path 62 between the input and the output. When there are few quality class 2 cells, the quality class 1 cells are output without delay. However, when there is a rapid increase in quality class 2 cells, these cells intrude in the transmission timing of the quality class 1 cells, with the result that delay occurs. In the example of FIG. 13, it is assumed that both quality class 1 and quality class 2 have an average cell rate of 3 cells/T.

In FIG. 14, which is a block diagram of a prior art system, transmitter TX comprises valid cell extractor 91 for eliminating idle cells from the input cells and extracting valid cells, transmission buffer 92, in which extracted cells are stored in order to absorb any fluctuation in their cell rate, and transmitting circuit 93 which transmits only the valid cells at a fixed rate. Valid cells are identified by comparing the virtual path identifier (VPI) and/or the virtual channel identifier (VCI), contained in the cell header, with the fixed VPI and/or VCI showing an idle cell, and detecting when these do not match.

In receiver RX, cells received by receiving circuit 94 are output in accordance with the transmission speed of the connections. The simplest method of doing this is to provide a first-in-first-out (FIFO) memory $96_1-96_n$ for each connection, i.e., for each VPI and/or VCI, and to have a leaky bucket scheme which reads these FIFO memories in accordance with the average cell rate of each connection. A FIFO read control method is the so-called round robin scheme which accesses FIFO memories $96_1-96_n$ in turn, outputs a cell if there is one to be read, and reads the next FIFO memory if there is not. If a round robin scheme is employed, receiver RX comprises cell demultiplexer 95 which demultiplexes cells into the various connections in accordance with the VPI and/or VCI; n FIFO memories $96_1-96_n$ each of which stores these cells; and FIFO read controller 97 for controlling the reading of these FIFO memories $96_1-96_n$. The cell reading rate of FIFO read controller 97 depends on the interface speed with the terminal or network, and the transmission speed between transmitter and receiver is either the same as or lower than the interface speed.

In the prior art, a separate FIFO memory is required for each connection and each FIFO memory has to have a capacity according to the maximum transmission speed allowed for the connection. For this reason, FIFO memories with very large capacities are required on the receiving side, which results in an increased hardware requirement.

One method of reducing the hardware requirement would be not to have a FIFO memory for each connection but instead to have a common memory and employ some form of address control for this memory. However, the memory address control would be extremely complex and difficult to implement. Furthermore, in all of these methods, because a memory corresponding to a connection with no quality requirement for cell delay variation will sometimes be read before a memory corresponding to a connection with stringent quality requirements for cell delay variation, the cell delay variation of this latter type of connection will sometimes increase.

The cell rate of a connection with no quality requirement for cell delay variation frequently fluctuates. Therefore, if a cell rate larger than the average cell rate R2 shown in FIG. 12 is input, transmission of cells for a connection with a stringent quality requirement for cell delay variation will be delayed, and the cell delay variation will be increased. This could be remedied if the buffer capacity of the receiver was increased or the average transfer delay was made larger, but the buffer capacity required for the FIFO memories would then become larger still.

SUMMARY OF THE INVENTION

The present invention has been devised in light of this situation. It is an object of this invention to provide an ATM cell transport system capable of satisfying the quality requirements for cell delay variation by means of simple, small-scale hardware. It is a further object of the present invention to provide ATM cell transport system that is capable of realizing high frequency utilization efficiency. It is yet another object of the present invention to provide an ATM cell transport system capable of making efficient use of allocated bandwidth or time slots.

A first feature of the present invention is that both the transmitter and the receiver demultiplex cells into quality classes based on permissible cell delay variation. A second feature of the present invention is the output control of cells that have been demultiplexed into these quality classes. This output control can, for example, comprise starting cell output with cells of a quality class with stringent quality requirements, and then successively proceeding to output cells of quality classes with more lenient quality requirements. Alternatively, the output control can cause outputting of cells of a quality class with a more lenient quality requirement after embedding them in gaps between cells of a quality class with a more stringent quality requirement.

A variety of control methods utilizing classification and storage in order of priority in accordance with required quality is also considered. For example, cells can be stored after being demultiplexed into N quality classes 1–N in order of decreasing quality required for cell delay variation. Stored cells are then preferentially read in order from 1 to N and transmitted on this basis. As a result, cells continue to be transmitted in order starting from cells of a quality class with a stringent quality requirement with respect to cell delay variation.

These objects are achieved by providing an ATM cell transport system comprising a transmitter (TX) for transmitting cells and a receiver (RX) for receiving cells, these cells being classified into quality classes according to the transmission quality requirements. The transmitter comprises a transmission cell demultiplexer to distribute cells in accordance with their quality class; transmission buffers each of which distinguishes and stores cells that have been distributed by the transmission cell demultiplexer; and a transmission buffer read controller which reads cells stored in the transmission buffers, starting from those cells with high priority as determined by the aforesaid quality class. The receiver comprises receiving buffers which store received cells, and a receiving buffer read controller which reads cells from the receiving buffers, starting from those with the aforesaid high priority.

It is preferable for the receiver to have a receiving cell demultiplexer to distribute received cells in accordance with their quality class, and for each receiving buffer to distinguish and store cells that have been distributed by this receiving cell demultiplexer. By thus demultiplexing cells into their quality classes, appropriate cell output control can be performed for each quality class.

The quality classes can be set to different values in each VPI and/or VCI, and it is preferable for the transmission cell demultiplexer and/or the receiving cell demultiplexer to include a table in which are recorded the quality class according to these values, and means for distributing cells after referring to this table. The quality class prescribed for each VPI and/or VCI is prescribed in a higher layer when a call connection is set up. Alternatively, the quality classes can be set to different values in each VPI and/or VCI. The transmission cell demultiplexer can include a table in which are recorded the quality class according to these values, means for distributing cells after referring to this table, and means for attaching an identifier indicating the quality class to a distributed cell. The receiving cell demultiplexer can include means for distributing cells in accordance with the identifiers of received cells.

The result of this is that cells can be distributed according to a quality class without providing a table in the receiver.

Alternatively, the transmitter can comprise a time stamp counter and a time stamp attacher which attaches the arrival time of a cell to that cell as a time stamp in accordance with this time stamp counter. The receiver can have a time stamp counter which generates the same timing as the time stamp counter of the transmitter, and a time stamp detector for detecting the time stamps of cells stored in the receiving buffers. The receiving buffer read controller can have means for reading cells stored in the receiving buffers in accordance with these time stamps, on the basis of the time stamp counter of the receiver.

Alternatively, the receiver can have a time stamp counter and a time stamp detector for detecting the time stamps of cells stored in the receiving buffers. The receiving buffer read controller can have means for reading cells stored in the receiving buffers in accordance with these time stamps, on the basis of the receiver time stamp counter. The transmitter can have a time stamp counter which generates the same timing as the time stamp counter of the receiver, and a time stamp attacher which attaches the arrival time of a cell to that cell as a time stamp in accordance with this time stamp counter of the transmitter.

By thus controlling cell output by means of time stamps, cell delay variation can be reduced. Furthermore, because the receiver and the transmitter attach and detect time stamps using time stamp counters that generate identical timing, erroneous cell order caused by time stamp counters becoming unsynchronized can be prevented.

A further possible alternative is for a plurality of transmitters to be provided; for the receiving cell demultiplexer to include means for distributing cells according to the quality class and the transmitter from which they have arrived; for each receiving buffer to include means for distinguishing and storing these distributed cells; and for the receiving buffer read controller to include means for reading cells starting from those with high priority as determined by the quality class, regardless of which transmitter a cell has arrived from. In this case, because the plurality of transmitters use the same time stamp counter as that provided in the receiver, the receiver can multiplex cells from the plurality of transmitters simply by running a single time stamp counter.

These and other objects, features, and characteristics of the present invention, and the combination of parts and economies of manufacture will become more apparent upon consideration of the following description and the appended claims, with reference to the accompanying drawings, all of which form a part of the specification, wherein like reference numerals designate corresponding parts in the various figures.

DESCRIPTION OF A PREFERRED EMBODIMENT

Figure 1:
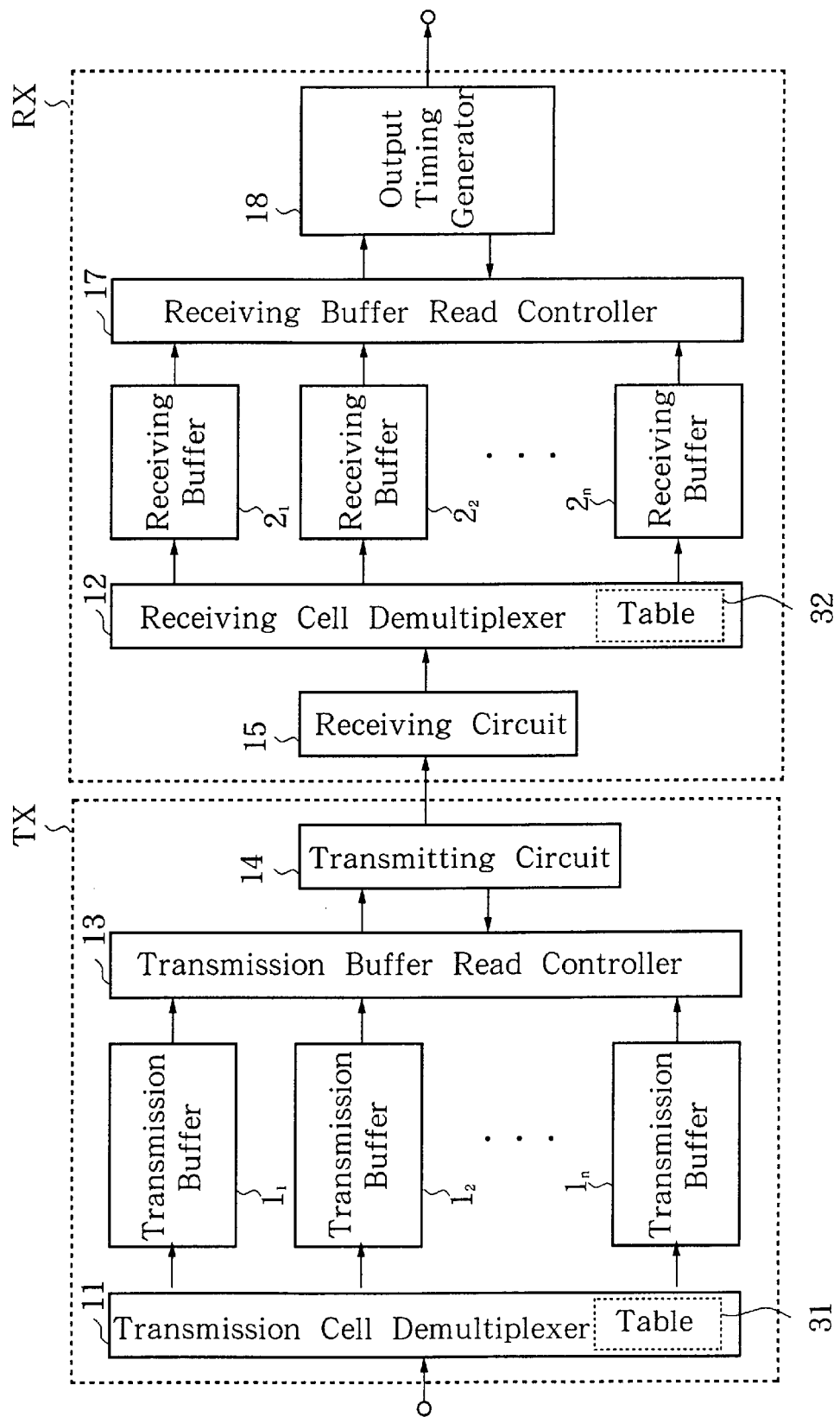
FIG. 1 is a block diagram of a first embodiment of this invention.

The constitution of a first embodiment of this invention will be explained with reference to FIG. 1, which is a block diagram of this first embodiment.

The ATM cell wireless transport system comprises a transmitter TX for transmitting cells and receiver RX for receiving cells. These cells are classified by quality classes according to the transmission quality requirements. The explanations given in the first, second, third and fourth embodiments of this invention assume that there is a wireless link between transmitter TX and receiver RX. Nevertheless, similar explanations apply if the wireless link were a wired link, and if there is a network between the transmitter and the receiver.

A distinguishing feature of the present invention is that transmitter TX comprises transmission cell demultiplexer 11 to distribute cells in accordance with their quality class; transmission buffers $1_1$–$1_n$, each of which distinguishes and stores cells that have been distributed by transmission cell demultiplexer 11; and a transmission buffer read controller 13, which reads cells stored in transmission buffers $1_1$–$1_n$ starting with those with high priority as determined by their quality class. A receiver RX comprises receiving buffers $2_1$–$2_n$ which store received cells, and a receiving buffer read controller 17 which preferentially reads cells from receiving buffers $2_1$–$2_n$ starting with high priority cells.

Furthermore, receiver RX comprises a receiving cell demultiplexer 12 to distribute received cells in accordance with their quality class, and receiving buffers $2_1$–$2_n$ each distinguishes and stores cells that have been distributed by receiving cell demultiplexer 12.

The quality classes can be set to different values in each VPI and/or VCI, and transmission cell demultiplexer 11 and/or receiving cell demultiplexer 12 have tables 31 and 32 in which are recorded the quality class according to these values. Transmission cell demultiplexer 11 and/or receiving cell demultiplexer 12 distribute cells after referring to tables 31 and 32.

The operation of this first embodiment of the invention will now be explained. Transmission cell demultiplexer 11 detects the VPI and/or VCI, contained in a cell header, and eliminates cells with the fixed VPI and/or VCI showing an idle cell. It also decides the quality class of cells on the basis of the correspondence between their VPI and/or VCI and quality classes 1 to n, and stores cells in transmission buffers $1_1$–$1_n$ which correspond to quality classes 1–n. As a result, cells classified according to quality class are stored in transmission buffers $1_1$–$1_n$. Transmission cell demultiplexer 11 has table 31 which stores the VPI and/or VCI information required for detecting idle cells and for classifying valid cells into the various quality classes.

Transmitting circuit 14 sends a predefined cell transmission timing for the wireless link to transmission buffer read controller 13. Transmission buffer read controller 13 reads a cell according to this timing from the transmission buffers $1_1$–$1_n$. Namely, it searches to see whether or not there is a cell to be transmitted in transmission buffer $1_1$, and if there is a cell, it reads it. If there is not, it searches to see whether or not there is a cell to be transmitted in transmission buffer $1_2$ which is next priority, and if there is a cell, it reads it. This is successively repeated, and if there is no cell to be transmitted in transmission buffer 1n which is last priority, a dummy cell is output. The same bit pattern as an idle cell can be used for the dummy cell. Cells that have been read are sent to transmitting circuit 14 and transmitted over the wireless link. As a result, the number of cells stored in transmitter TX decreases, as quality class successively changes from n to 1.

Receiving cell demultiplexer 12 detects the VPI and/or VCI contained in the headers of cells that have been received by receiving circuit 15, and eliminates cells with the fixed VPI and/or VCI showing a dummy cell. It also decides the quality class of cells on the basis of the correspondence between their VPI and/or VCI and quality classes 1–n, and stores cells in receiving buffers $2_1$–$2_n$ which correspond to quality classes 1–n. Receiving cell demultiplexer 12 has table 32 which stores the VPI and/or VCI information required for detecting dummy cells and for classifying valid cells into the various quality classes.

Output timing generator 18 sends a predefined cell transmission timing for subsequent terminals or networks to receiving buffer read controller 17. Receiving buffer read controller 17 reads a cell from the n receiving buffers $2_1$–$2_n$ according to this timing. Namely, it searches to see whether or not there is a cell to be output from receiving buffer $2_1$ and if there is a cell, it reads it. If there is not, it searches to see whether or not there is a cell to be output from receiving buffer $2_2$ which is next priority, and if there is a cell, it reads it. This is successively repeated, and if there is no cell to be output from receiving buffer $2_n$ which is last priority, an idle cell is output. This cell is sent to output timing generator 18, and is output to subsequent terminals or networks. As a result, the number of cells stored in receiver RX decreases as quality class successively changes from n to 1.

Figure 2:
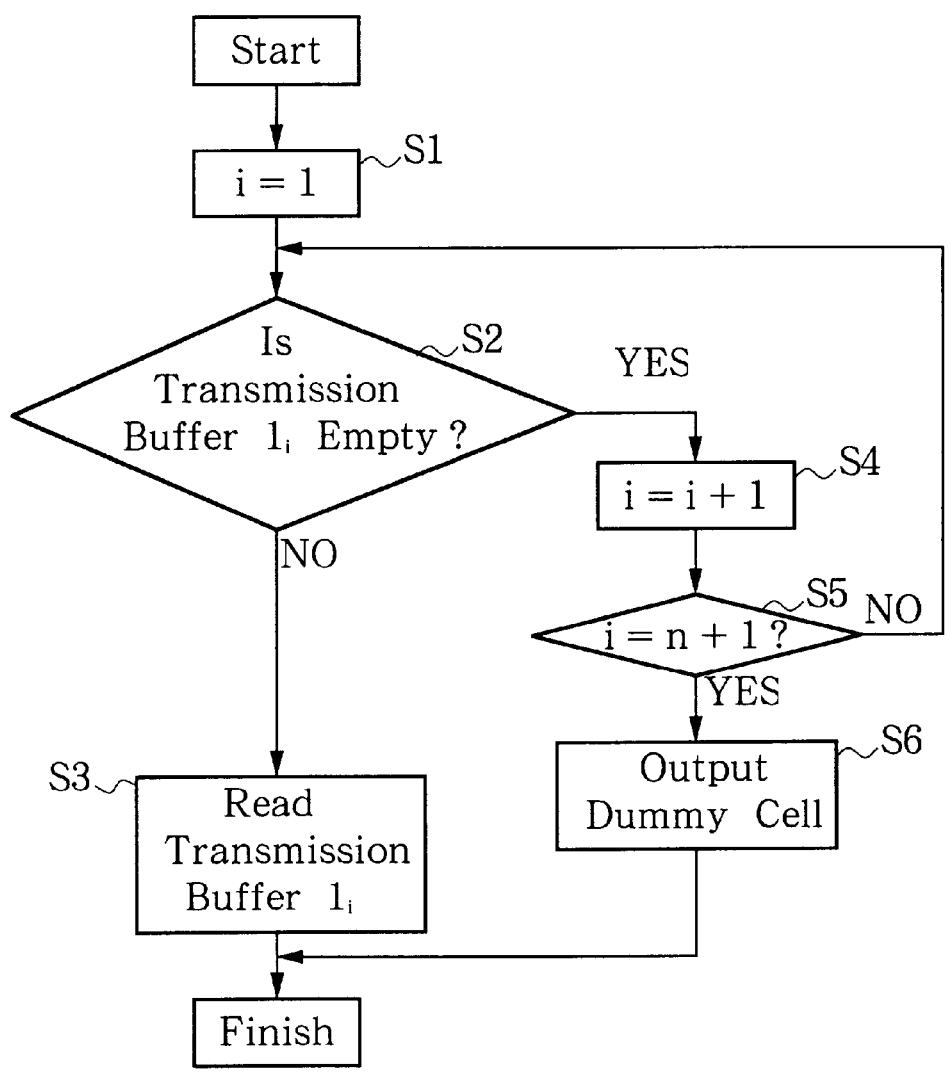
FIG. 2 is a flowchart showing the operation of the transmission buffer read controller in the first embodiment of this invention.
Figure 3:
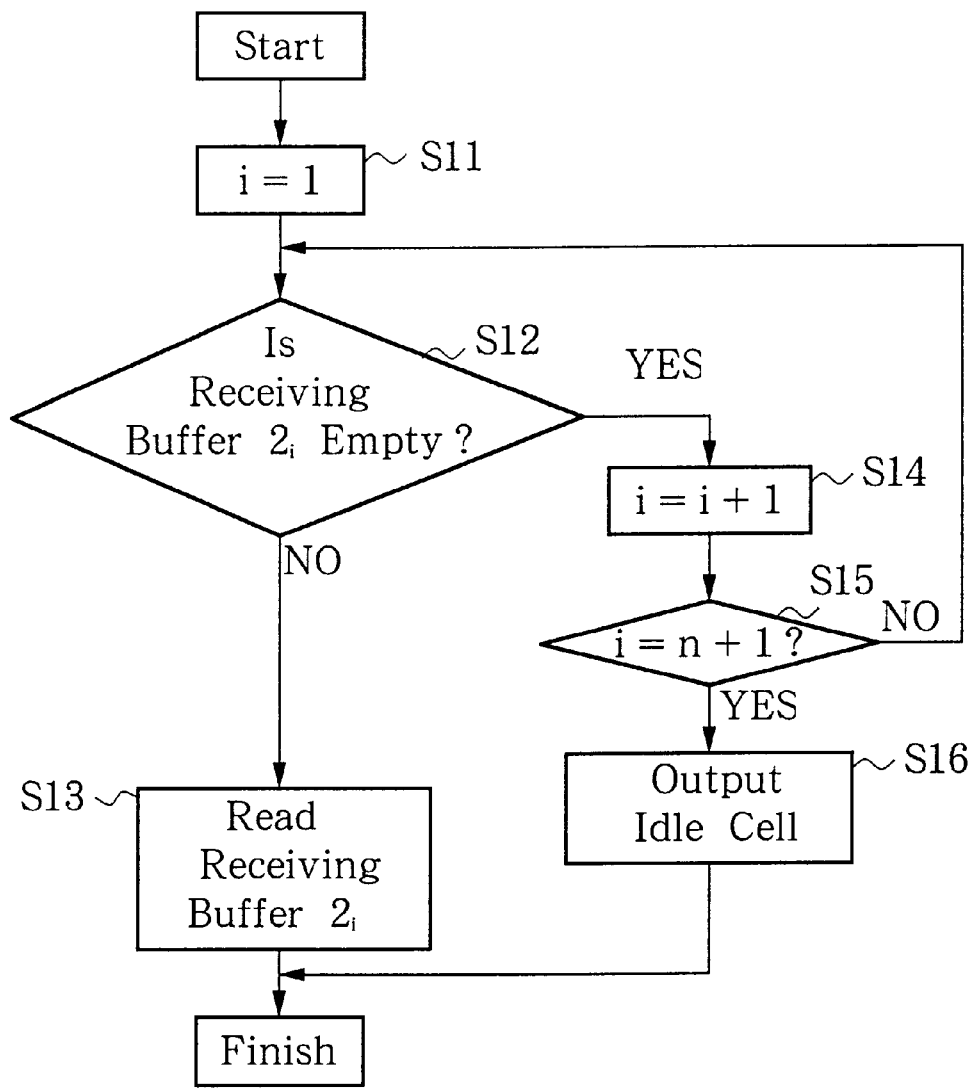
FIG. 3 is a flowchart showing the operation of the receiving buffer read controller in the first embodiment of this invention.

The operation of transmission buffer read controller 13 and receiving buffer read controller 17 according to this first embodiment of the invention will be explained with reference to FIG. 2 and FIG. 3. FIG. 2 is a flowchart showing the operation of transmission buffer read controller 13 in the first embodiment. FIG. 3 is a flowchart showing the operation of receiving buffer read controller 17 in this first embodiment. As shown in FIG. 2, transmission buffer read controller 13 successively reads cells from transmission buffer $1_1$ to transmission buffer $1_n$, which respectively store cells of quality classes 1–n. Namely, it starts reading at transmission buffer $1_1$ (i=1) (S1). If there is a cell in transmission buffer $1_1$ (S2), it reads a cell from this transmission buffer (S3). If transmission buffer $1_1$ is empty (S2), transmission buffer read controller 13 starts reading at transmission buffer $1_2$ (i=2) (S4→S5→S2→S3). When reading from transmission buffer $1_n$ is completed, it insets a dummy cell (S6). The result of this processing is that cells are transmitted to receiver RX starting from those with a high quality requirement with respect to cell delay variation.

As shown in FIG. 3, receiving buffer read controller 17 successively reads cells from receiving buffer $2_1$ to receiving buffer $2_n$, which respectively store cells of quality classes 1–n. Namely, it starts reading at receiving buffer $2_1$ (i=1) (S11). If there is a cell in receiving buffer $2_1$ (S12), it reads a cell from this receiving buffer (S13). If receiving buffer $2_1$ is empty (S12), receiving buffer read controller 17 starts reading at receiving buffer $2_2$ (i=2) (S14→S15→S12→S13). If receiving buffer $2_n$ is empty, it inserts an idle cell (S16). The result of this processing is that cells are output to a terminal or a network starting from those with a high quality requirement as regards cell delay variation.

Figure 4:
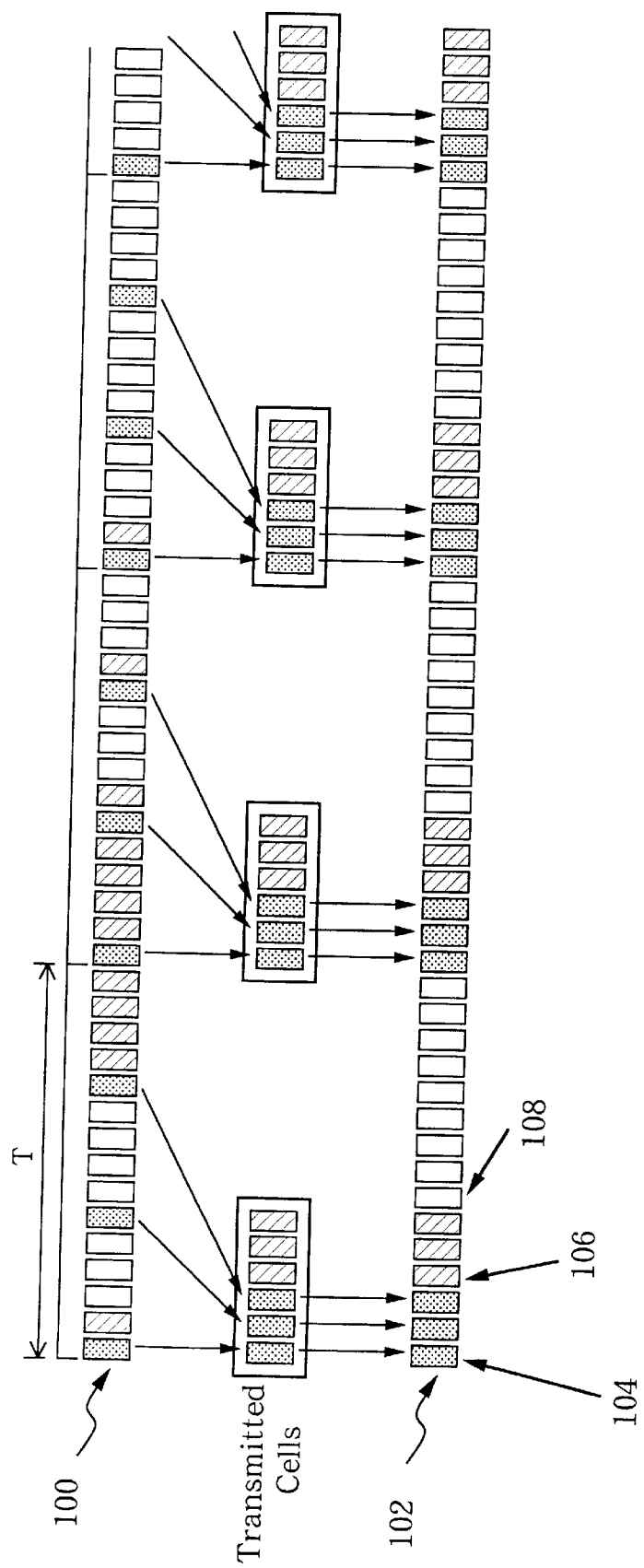
FIG. 4 shows the relation between input cells and output cells in a first embodiment of this invention.
Figure 12:
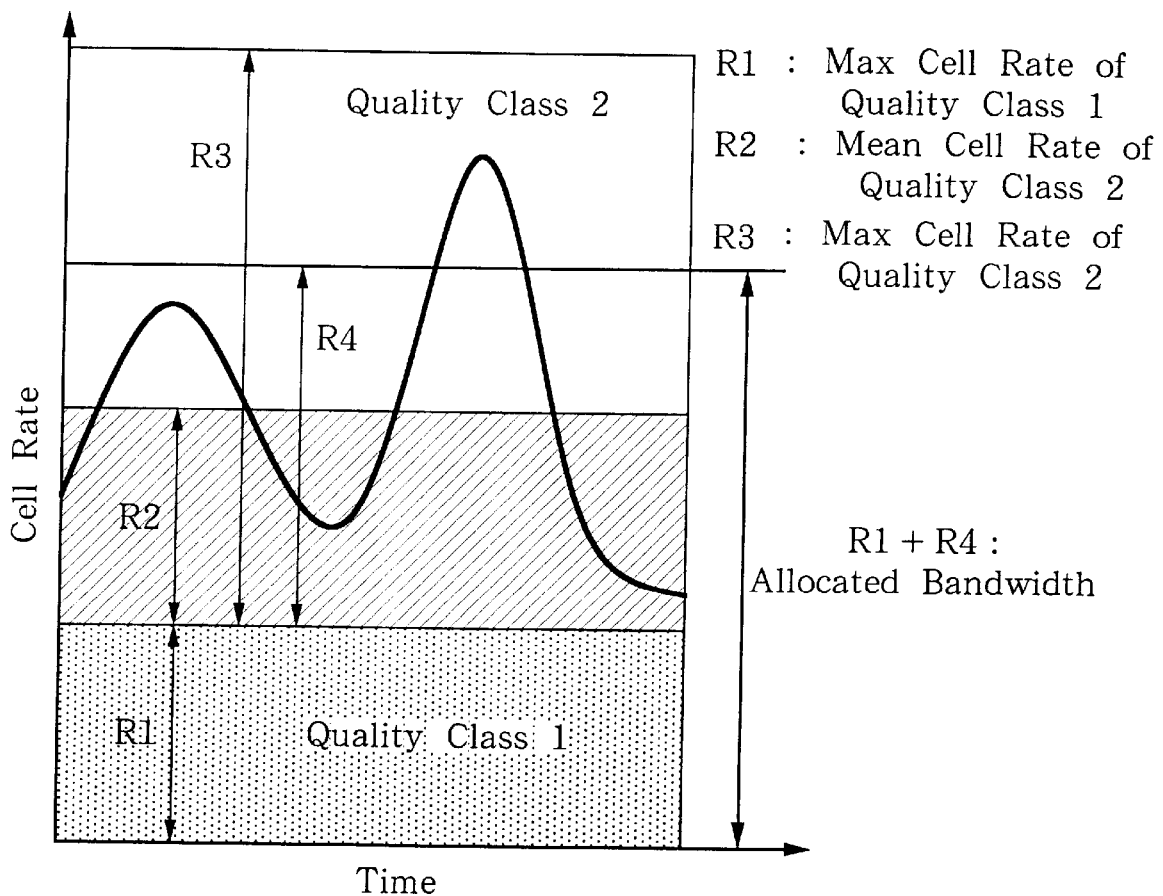
FIG. 12 serves to explain the allocation of bandwidth or time slots.
Figure 13:
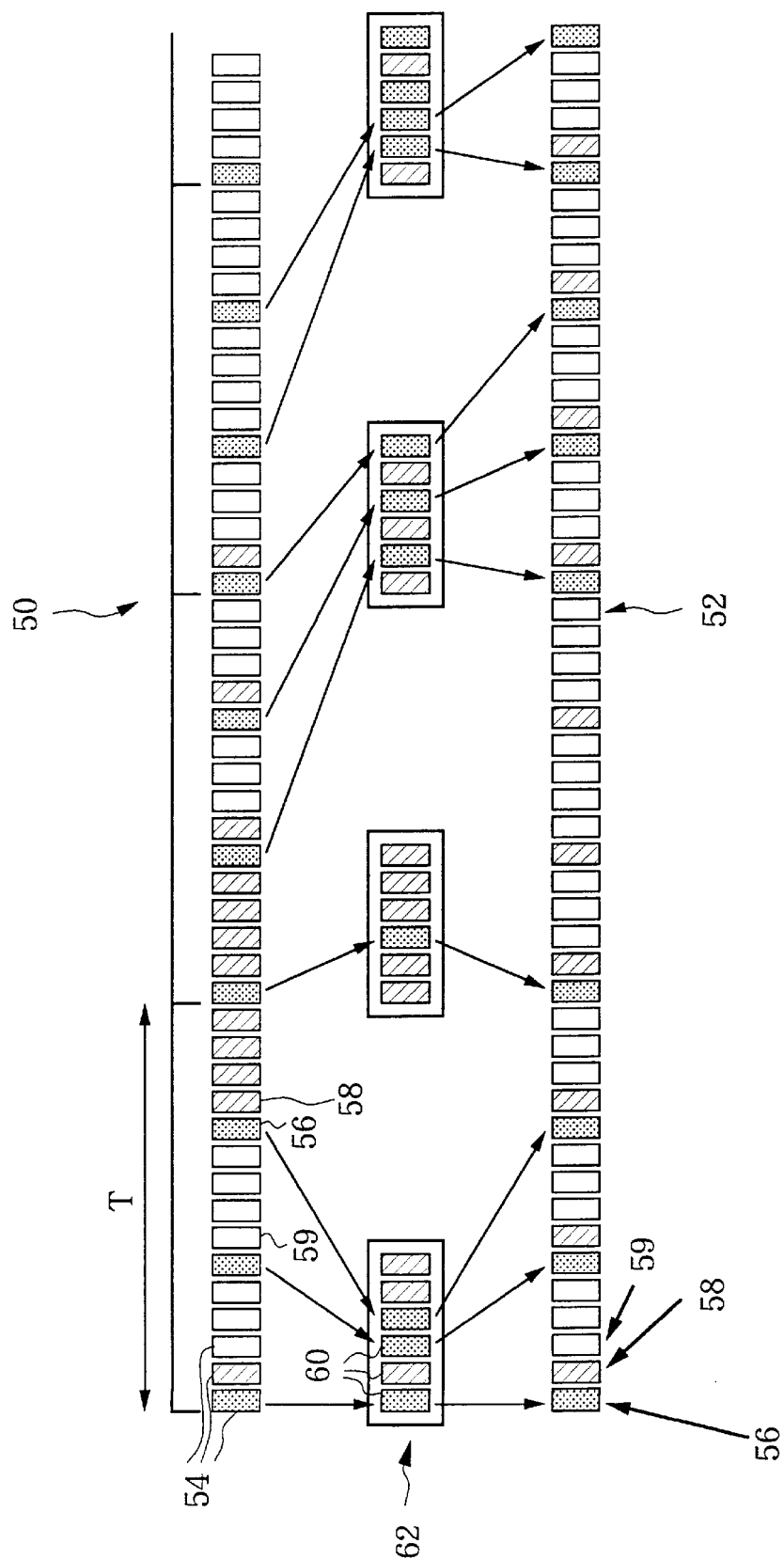
FIG. 13 shows the relation between input cells and output cells in a prior art example.
Figure 14:
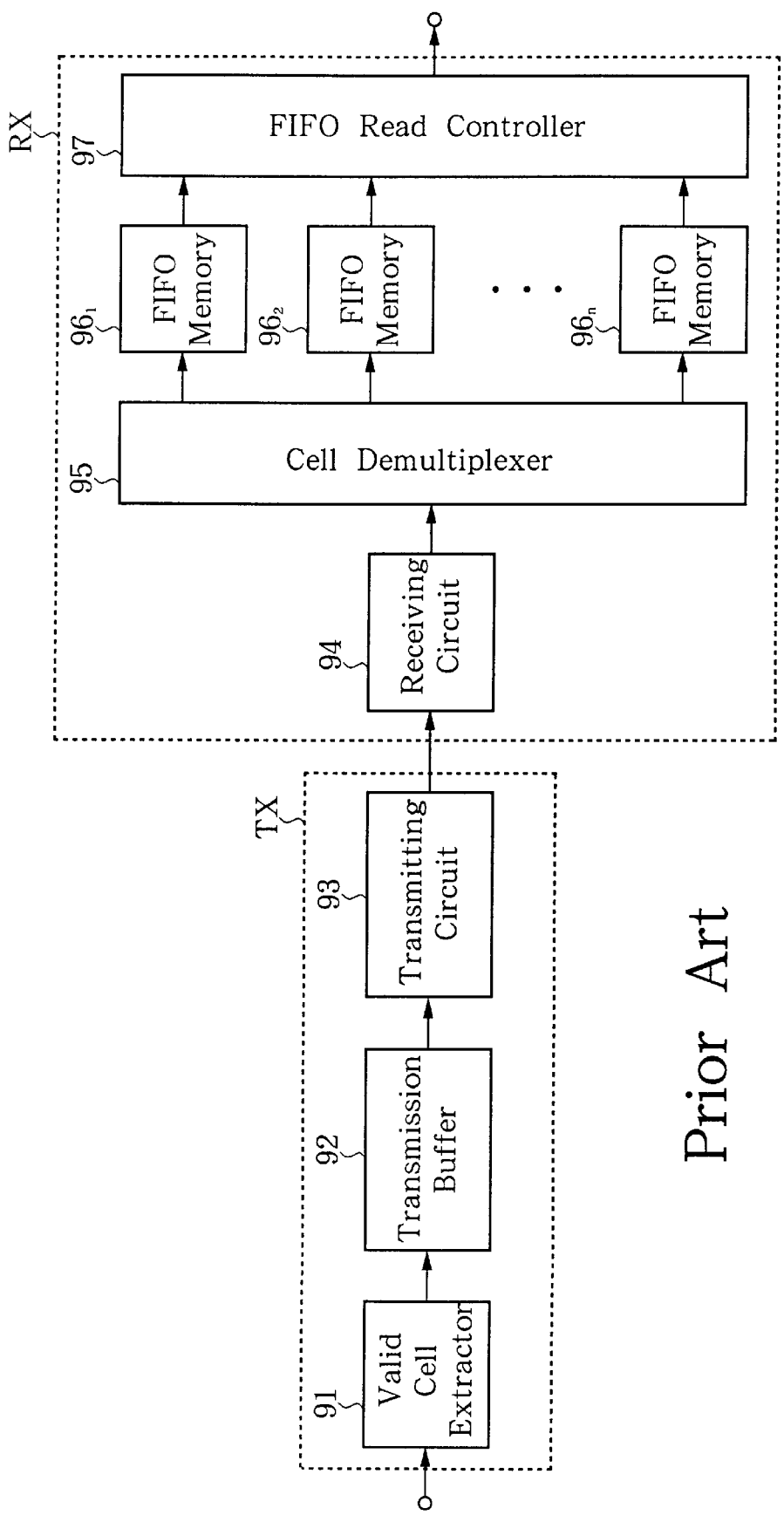
FIG. 14 is a block diagram of a prior art system.

FIG. 4 shows the relation between input cells 100 to transmitter TX and output cells 102 from receiver RX according to this first embodiment of the invention. There are three kinds of input cell: namely, quality class 1 (104), quality class 2 (106), and idle cells 108. Quality class 1 has been assumed to have a constant cell rate, quality class 2 has been assumed to have a variable cell rate, and the average cell rate of quality class 1 and quality class 2 has been assumed to be 3 cells/T (seconds). Cells are transmitted from transmitter TX to receiver RX at a rate of 6 cells/T (seconds). Given this situation, in the prior art example depicted in FIG. 12, if quality class 2 cells momentarily increase, quality class 1 cells are stored lengthily at the transmitting side, with the result that a large cell delay variation occurs for quality class 1 cells. This cell delay variation becomes even larger if R2 (the average cell rate of quality class 2) is much larger than R1 (the maximum cell rate of quality class 1). On the other hand, according to the present invention, even if quality class 2 cells momentarily increase, the cell delay variation of quality class 1 can be kept constant.

In the present invention, quality class 1 is always transmitted preferentially whatever the fluctuation of cells rate in quality class 2 and any subsequent classes. Therefore, if the length of 1 transmission frame in for example a wireless communication system is T seconds, the cell delay variation of quality class 1 cells is always less than T seconds.

Figure 5:
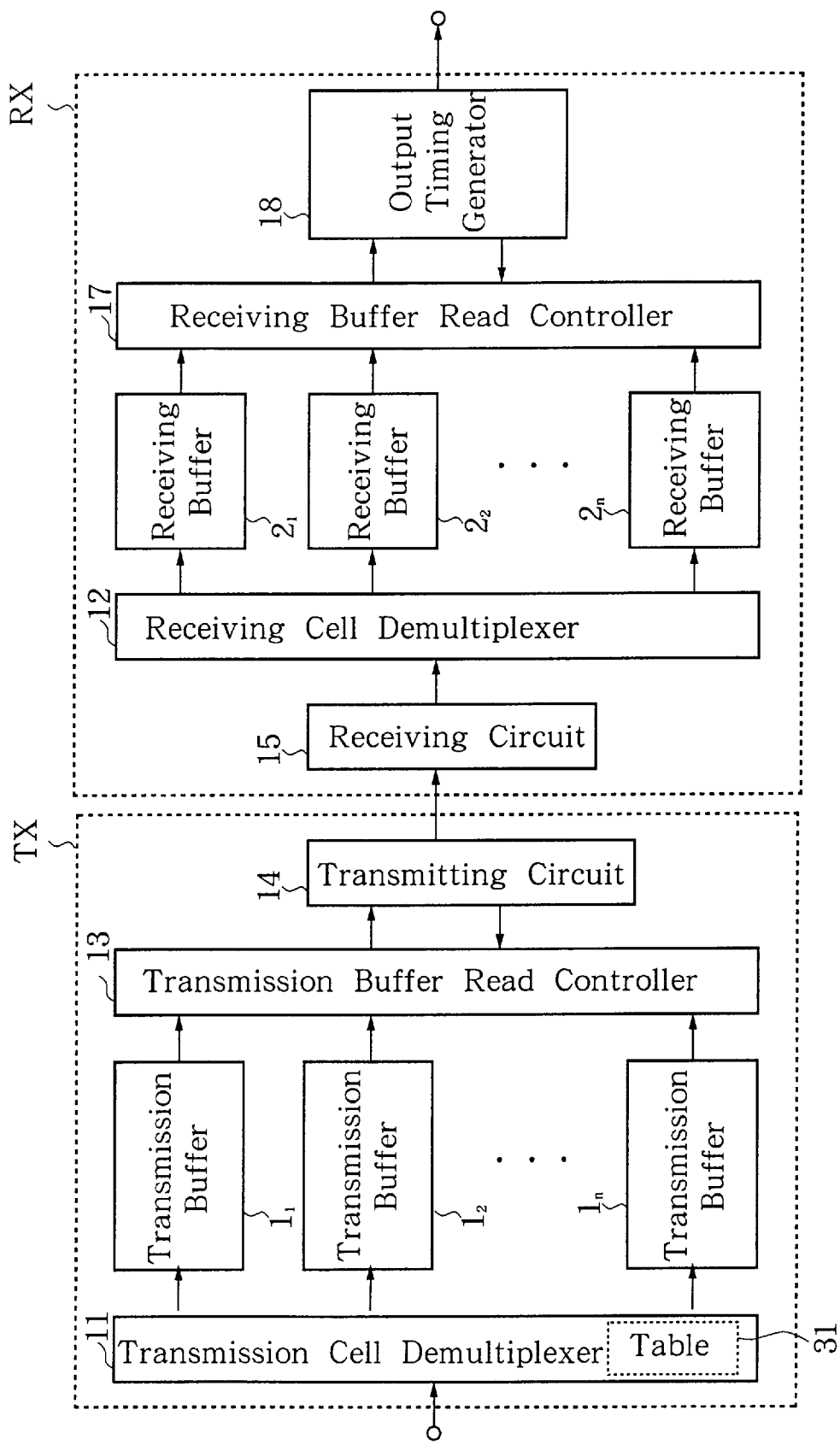
FIG. 5 is a block diagram of a second embodiment of this invention.

A second embodiment of this invention will be explained with reference to FIG. 5, which is a block diagram of this second embodiment.

Whereas the first embodiment had tables 31 and 32, this second embodiment has a table, 31, in transmitter TX only. A different standard may be set for the aforementioned quality class in each VPI and/or VCI, and transmission cell demultiplexer 11 has table 31 in which are recorded the quality class to these standards. Transmission cell demultiplexer 11 distributes cells after referring to this table 31, and attaches an identifier indicating of the quality class to the distributed cells. Receiving cell demultiplexer 12 distributes cells in accordance with the identifiers of the received cells. By thus attaching an identifier indicating quality class to a cell table 32 in receiver RX can be omitted.

Figure 6:
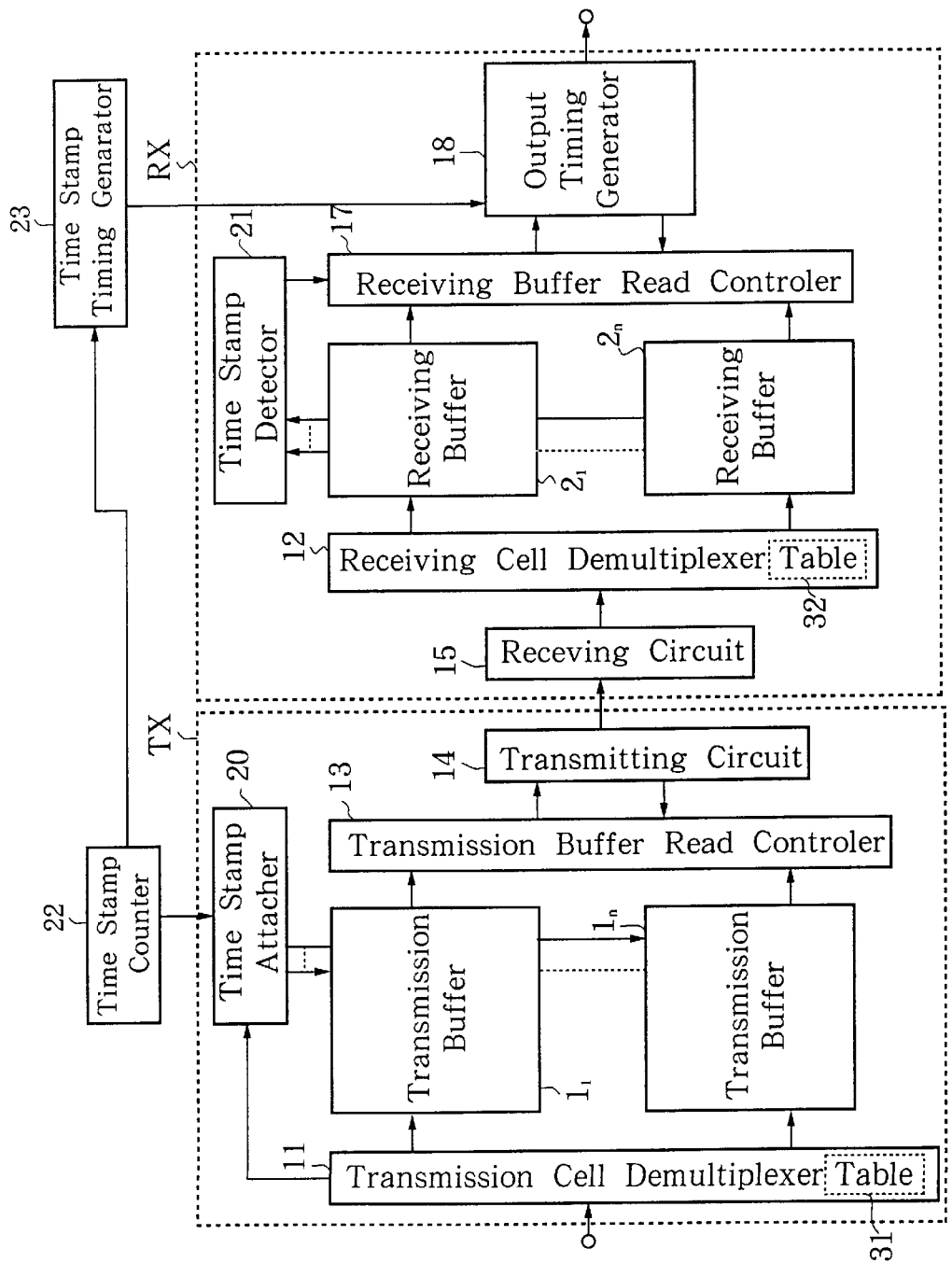
FIG. 6 is a block diagram of a third embodiment of this invention.
Figure 7:
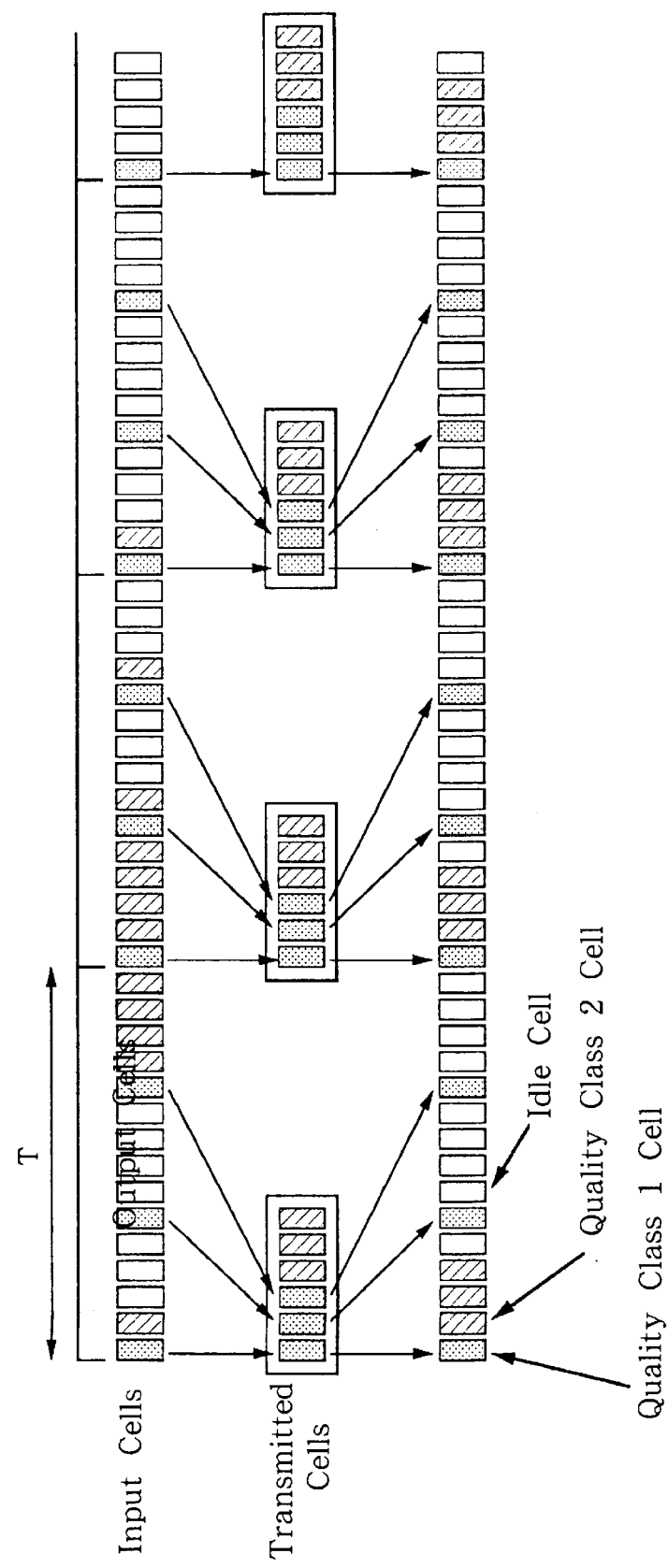
FIG. 7 is a flowchart showing the operation of the receiving buffer read controller in a third embodiment of this invention.

A third embodiment of this invention will be explained with reference to FIG. 6 and FIG. 7. FIG. 6 is a block diagram of this third embodiment, while FIG. 7 is a flowchart showing the operation of receiving buffer read controller 17 according to this third embodiment. A distinguishing feature of this third embodiment is that transmitter TX has a time stamp attacher 20 and a time stamp counter 22, and a receiver RX has time stamp detector 21 and time stamp timing generator 23. Time stamp timing generator 23 generates the same timing as time stamp counter 22 of transmitter TX, and can be implemented by means of a time stamp counter which counts synchronously with time stamp counter 22 of transmitter TX.

When a cell arrives at transmitter TX, time stamp attacher 20 attaches a time stamp showing the arrival time to this cell, in accordance with time stamp counter 22. Time stamp counter 22 also transmits a reference time to receiver RX. Cells stored in transmission buffers $1_1$–$1_n$ are transferred to receiver RX and are stored in its receiving buffers $2_1$–$2_n$, in accordance with the same procedure that was explained in connection with the first embodiment.

Time stamp detector 21 of receiver RX detects time stamps of cells stored in receiving buffers $2_1$–$2_n$ and generates the cell read timing for receiving buffer read controller 17. This timing is different from the cell output timing that is sent to receiving buffer read controller 17 from output timing generator 18, and constitutes a cell reading schedule generated in accordance with the time stamps detected by time stamp detector 21.

Time stamp timing generator 23 generates timing on the basis of the reference time received from transmitter TX. Output timing generator 18 sends cell output timing to receiving buffer read controller 17 in accordance with this timing generated by time stamp timing generator 23.

The operation of receiving buffer read controller 17 will now be explained. In this explanation, T0 is the cell output timing and T1i is the cell read timing for quality class i, as generated by time stamp detector 21. As shown in FIG. 7, receiving buffer read controller 17 successively reads cells from receiving buffer $2_1$ to receiving buffer $2_n$, which respectively store cells of quality classes 1–n. In other words, the output of cells is started from quality class 1 (i=1) (S21). If the cell read timing T11 of quality class 1 cell, coincides with or lags behind the cell output timing T0 (S22), receiving buffer read controller 17 reads that cell from receiving buffer $2_1$ (S23). If cell read timing T11 leads cell output timing T0 (S22), receiving buffer read controller 17 starts reading from receiving buffer $2_2$ (i=2) (S24→S25→S22→S23). If no cells have been read up to receiving buffer $2_n$, an idle cell is output (S26).

Figure 8:
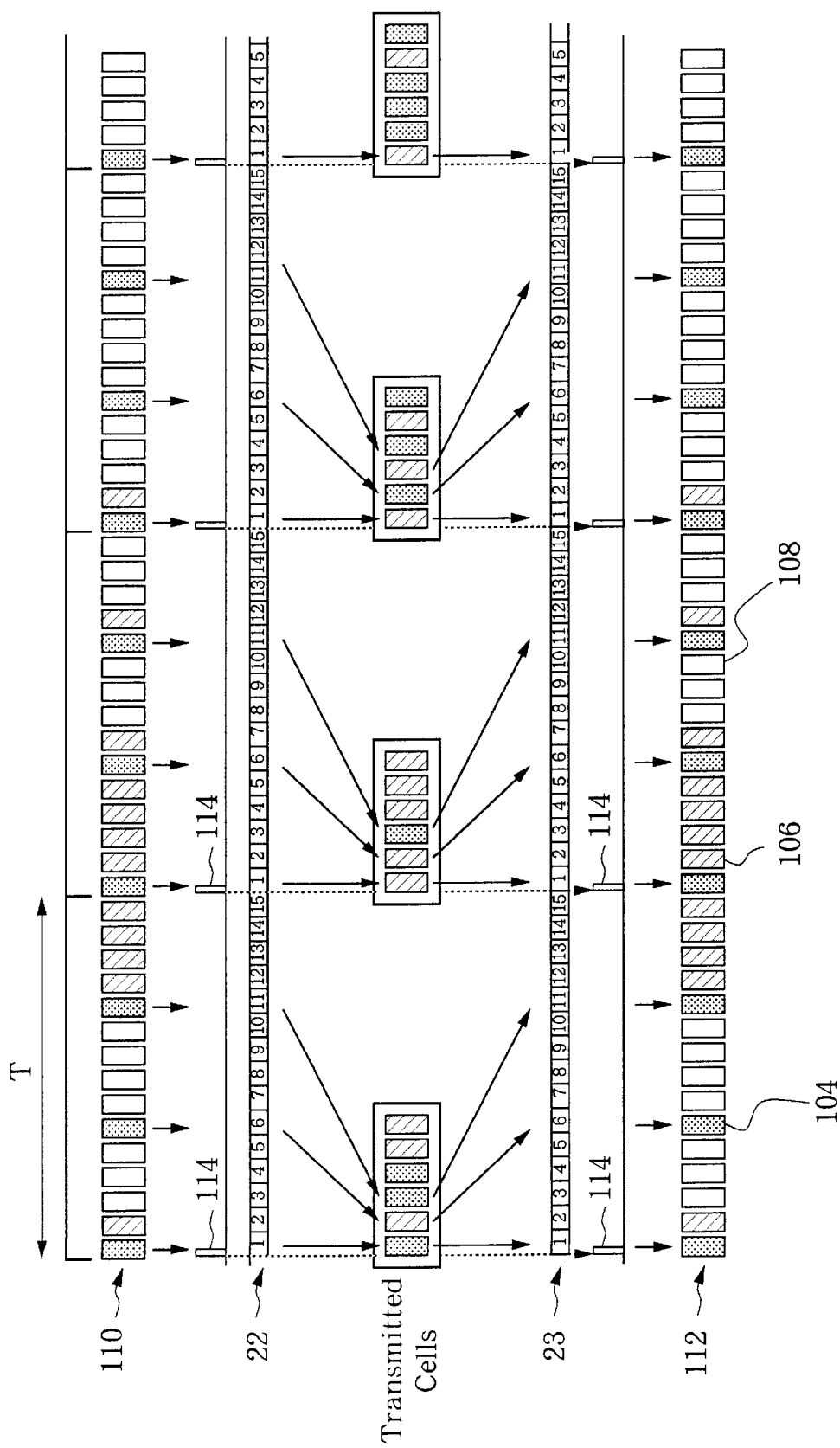
FIG. 8 shows the relation between input cells and output cells in a third embodiment of this invention.

FIG. 8 shows the relation between input cells 110 to transmitter TX and output cells 112 from receiver RX according to this third embodiment. In the example illustrated in FIG. 8, the input cell and wireless link conditions are the same as in FIG. 4. Time stamp counter 22 of transmitter TX transmits a reference time 114 to receiver RX at intervals of T, and the time stamp counters of transmitter TX and receiver RX are reset at the reference time interval. In addition, quality class 2 cells are output with a fixed delay T after the input time, so that errors in cell order do not occur. As will be evident from FIG. 8, by using time stamps, receiver RX can regenerate the arrival intervals of cells that were input to transmitter TX, and, in particular, the cell transfer delay and cell delay variation of quality class 1 cells 116 can be decreased, and the cell delay variation of quality class 2 cells 118 can also be decreased. Moreover, because receiver RX uses the same time stamp counter as transmitter TX, erroneous cell order caused by the time stamp counters of transmitter TX and receiver RX becoming unsynchronized can be prevented.

In this third embodiment of the invention, table 32 of receiver RX can be omitted and a table 31 provided in transmitter TX only, if transmission cell demultiplexer 11 distributes cells after referring to this table 31 and attaches an identifier indicative of quality class to the cells, and receiving cell demultiplexer 12 distributes cells in accordance with the identifiers of the received cells.

Figure 9:
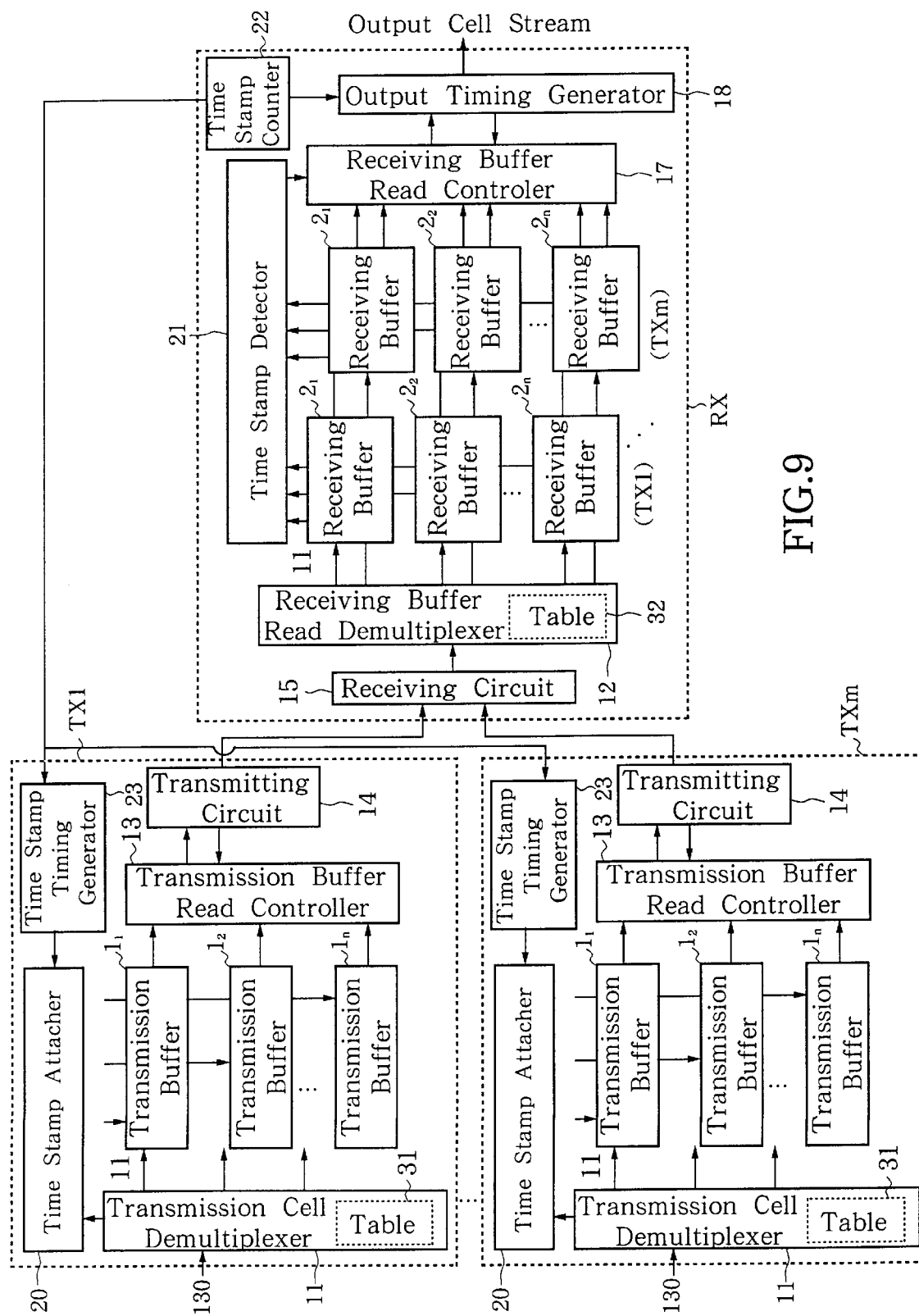
FIG. 9 is a block diagram of a fourth embodiment of this invention.
Figure 10:
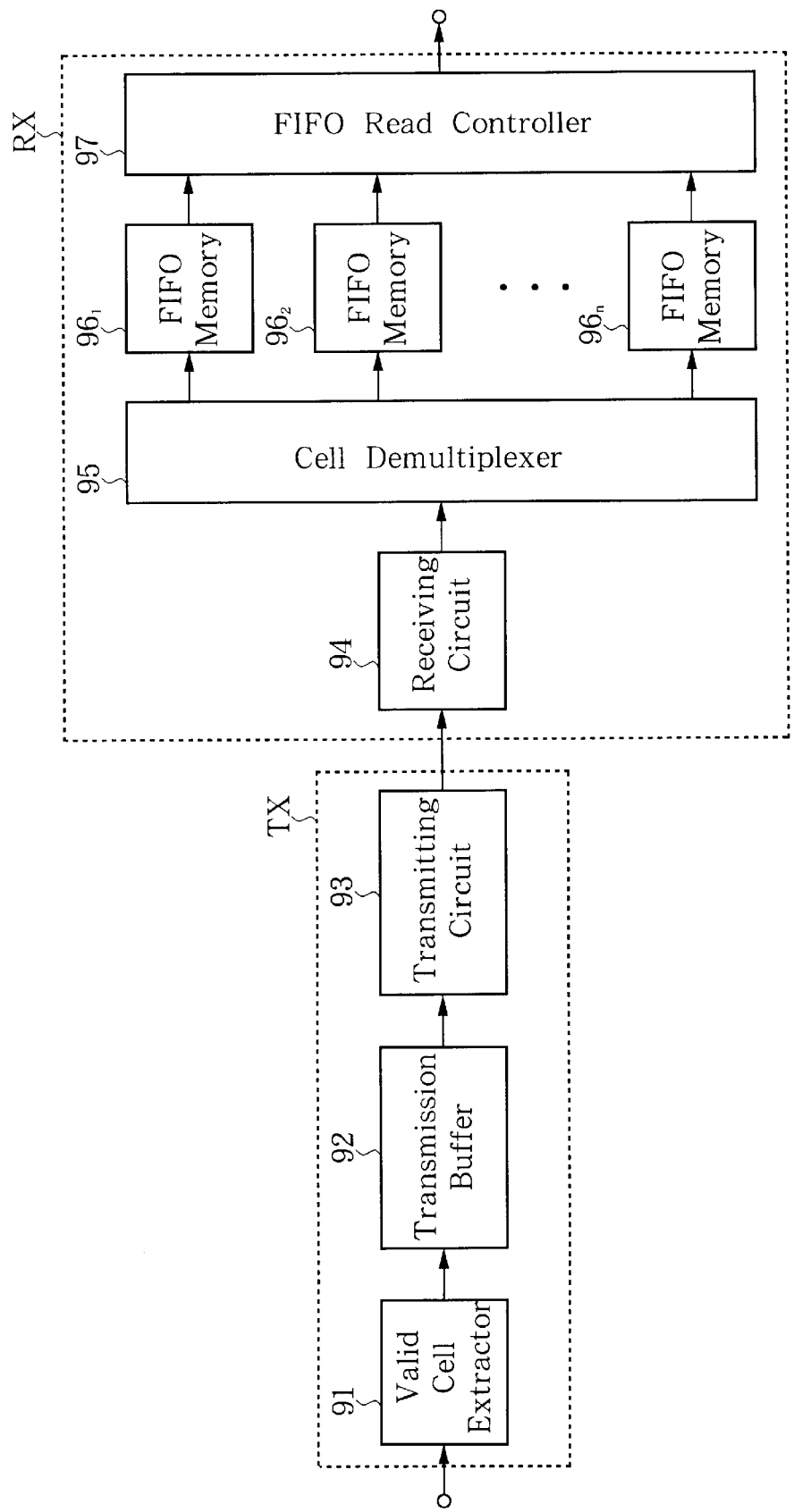
FIG. 10 is a flowchart showing the operation of the receiving buffer read controller in a fourth embodiment of this invention.

A fourth embodiment of this invention will be explained with reference to FIG. 9 and FIG. 10. FIG. 9 is a block diagram of this fourth embodiment, while FIG. 10 is a flowchart showing the operation of receiving buffer read controller 17 according to this fourth embodiment. A distinguishing feature of this fourth embodiment is that transmitters TX1–TXm have time stamp attachers 20 and time stamp timing generators 23, and receiver RX has receiving buffers $2_{1(TX1)}$–$2_{n(TX1)}$, $2_{1(TX2)}$–$2_{n(TX2)}$, ... $2_{1(TXm)}$–$2_{n(TXm)}$, time stamp detector 21, and time stamp counter 22.

Cells 130 that have arrived at transmitters TX1–TXm are transmitted to receiver RX in accordance with the same procedure as explained in respect of the third embodiment. In addition, time stamp timing generator 23 in each transmitter TX1–TXm generates timing on the basis of a reference time received from receiver RX.

Receiving cell demultiplexer 12 of receiver RX distributes cells received from transmitters TX1–TXm according to quality class and to the transmitter, and stores the cells to receiving buffers $2_{1(TX1)}$–$2_{n(TX1)}$, $2_{1(TX2)}$–$2_{n(TX2)}$, ... $2_{1(TXm)}$–$2_{n(TXm)}$ which correspond to quality classes 1–n and transmitters TX1–TXm.

Time stamp detector 21 generates a cell read timing corresponding to each receiving buffer $2_{1(TX1)}$–$2_{n(TX1)}$, $2_{1(TX2)}$–$2_{n(TX2)}$, ... $2_{1(TXm)}$–$2_{n(TXm)}$ in accordance with the same procedure as explained in respect of the third embodiment. In addition, time stamp counter 22 sends a reference time to transmitters TX1–TXm.

Receiving buffer read controller 17 reads cells from receiving buffers $2_{1(TX1)}$–$2_{n(TX1)}$, $2_{1(TX2)}$–$2_{n(TX2)}$, ... $2_{1(TXm)}$–$2_{n(TXm)}$ according to quality classes 1–n independent of transmitters TX1–TXm. Namely, receiving buffers $2_{1(TX1)}$–$2_{1(TXm)}$, all of which correspond to quality class 1, are first of all read in that order, after which reading successively proceeds to receiving buffers corresponding to the next quality class, and finishes with receiving buffers $2_{n(TX1)}$–$2_{n(TXm)}$, which correspond to quality class n. As shown in FIG. 10, if transmitter TXj has priority over transmitter TXj+1 (j=1 to m−1), receiving buffer read controller 17 reads cells starting from receiving buffer $2_{1(TX1)}$ (i=1, j=1), which corresponds to quality class 1 and transmitter TX1 (S31). If $T1_{1(TX1)} \leq T0$ (S32), it reads a cell from receiving buffer $2_{1(TX1)}$ (S33). If $T1_{1(TX1)} > T0$ (T32), receiving buffer read controller 17 compares cell read timing $T1_{1(TX2)}$ of receiving buffer $2_{1(TX2)}$ (i=1, j=2) corresponding to quality class 1 and transmitter TX2 with cell output timing T0, and if $T1_{1(TX2)} \pounds T0$, it reads a cell from receiving buffer $2_{1(TX2)}$ (S34→S35→S32→S33) If $T1_{1(TXm)} > T0$ (i=1, j=m) (S32), receiving buffer read controller 17 compares cell read timing $T1_{2(TX1)}$ (i=2, j=1) of receiving buffer $2_{2(TX1)}$ with cell output timing T0 (S34→S35→S36→S37→S31→S32), and if no cell is read up to receiving buffer $2_{n(TXm)}$, it outputs an idle cell (S38).

Figure 11:
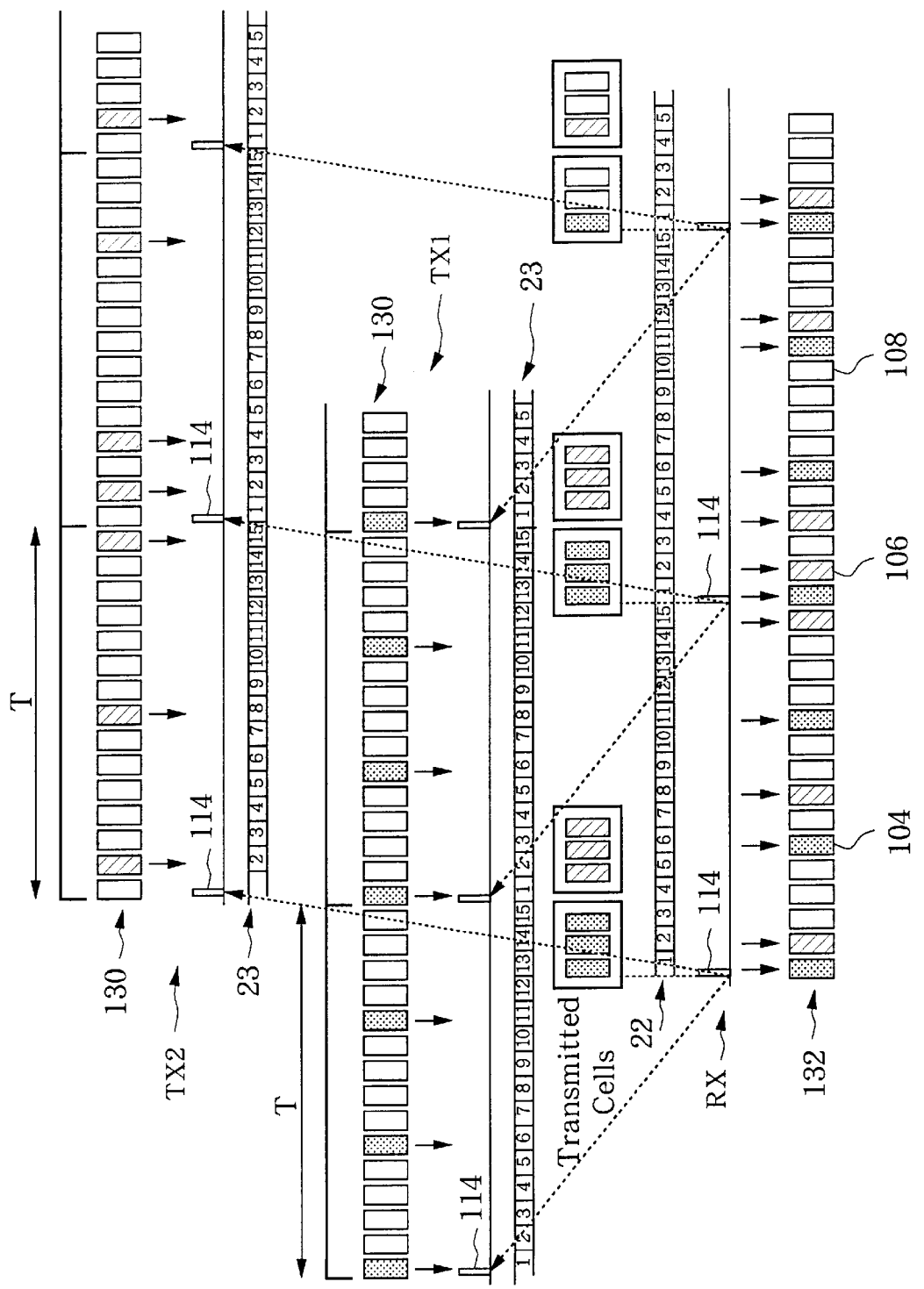
FIG. 11 shows the relation between input cells and output cells in a fourth embodiment of this invention.

FIG. 11 shows the relation between input cells 130 to transmitters TX1 and TX2 and output cells 132 from receiver RX according to this fourth embodiment. In the example illustrated in FIG. 11, there are two transmitters TX1 and TX2 and cells of quality class 1 are input to both transmitters TX1 and TX2. As shown in FIG. 11, because transmitters TX1 and TX2 use time stamp timing generators 23 generating the same timing as time stamp counter 22 of receiver RX, receiver RX can multiplex cells from transmitters TX1 and TX2 by having just a single time stamp counter 22. It can also reduce cell delay variation by means of the time stamps.

In this fourth embodiment, table 32 of receiver RX can be omitted and a table 31 provided in transmitters TX1–TXm only, if transmission cell demultiplexers 11 distribute cells after referring to these tables 31 and attach identifiers indicative of quality class to the cells, and receiving cell demultiplexer 12 distributes cells in accordance with the identifiers of the received cells.

As has been explained above, the present invention is capable of meeting the quality requirements for cell delay variation by means of simple, small-scale hardware. It can therefore make efficient use of frequency. It can also make efficient use of allocated bandwidth or time slots.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. An asynchronous transfer mode ("ATM") cell transport system in a wireless communication system, comprising:
   a transmitter for transmitting cells; and
   a receiver for receiving cells classified into quality classes according to transmission quality requirements;
   wherein the transmitter comprises:

a transmission cell demultiplexer to distribute cells according to their quality class;

transmission buffers each of which distinguishes and stores cells that have been distributed by the transmission cell demultiplexer; and a transmission buffer read controller which reads cells stored in the transmission buffers starting from cells with a high priority as determined by the quality class thereof; and wherein the receiver comprises:

receiving buffers which store received cells; and a receiving buffer read controller which reads cells from the receiving buffers starting from cells with the high priority;

wherein:

the transmitter has a time stamp counter and a time stamp attacher which attaches the arrival time of a cell to that cell as a time stamp according to the output of the time stamp counter;

the receiver has a time stamp counter which generates the same timing as the time stamp counter of the transmitter, and a time stamp detector for detecting the time stamps of cells stored in the receiving buffers; and the receiving buffer read controller has a reading element which reads cells stored in the receiving buffers according to the time stamps on the basis of the time stamp counter of the receiver.

2. An asynchronous transfer mode ("ATM") cell transport system in a wireless communication system, comprising:

a transmitter for transmitting cells; and a receiver for receiving cells classified into quality classes according to transmission quality requirements;

wherein the transmitter comprises:

a transmission cell demultiplexer to distribute cells according to their quality class;

transmission buffers each of which distinguishes and stores cells that have been distributed by the transmission cell demultiplexer; and a transmission buffer read controller which reads cells stored in the transmission buffers starting from cells with a high priority as determined by the quality class thereof; and wherein the receiver comprises:

receiving buffers which store received cells; and receiving buffer read controller which reads cells from the receiving buffers starting from cells with the high priority;

wherein:

the receiver has a time stamp counter and a time stamp detector for detecting the time stamps of cells stored in the receiving buffers, and the receiving buffer read controller has a cell reading element which reads cells stored in the receiving buffers according to the time stamps on the basis of the time stamp counter in the receiver; and the transmitter has a time stamp counter which generates the same timing as the time stamp counter of the receiver, and a time stamp attacher which attaches the arrival time of a cell to that cell as a time stamp according to the output of the time stamp counter of the transmitter.

3. An ATM cell transport system according to claim 2, further comprising a plurality of transmitters, and wherein the receiving cell demultiplexer includes a distributing element which distributes cells according to the quality class and to the transmitter from which they have arrived, each receiving buffer including a distinguishing and storing element which distinguishes and stores the distributed cells, and the receiving buffer read controller including a reading element which preferentially reads cells, starting from cells having high priority as determined by the quality class, regardless of which transmitter a cell has arrived from.

4. An asynchronous transfer mode ("ATM") cell transport system in a wireless communication system, comprising:

a transmitter for transmitting cells; and a receiver for receiving cells classified into quality classes according to transmission quality requirements;

wherein the transmitter comprises:

a transmission cell demultiplexer to distribute cells according to their quality class;

transmission buffers each of which distinguishes and stores cells that have been distributed by the transmission cell demultiplexer; and a transmission buffer read controller which reads cells stored in the transmission buffers starting from cells with a high priority as determined by the quality class thereof; and wherein the receiver comprises:

receiving buffers which store received cells; and a receiving buffer read controller which reads cells from the receiving buffers starting from cells with the high priority;

wherein the receiver includes a receiving cell demultiplexer to distribute received cells in accordance with the quality class thereof, and the receiving buffers each distinguish and store cells that have been distributed by the receiving cell demultiplexer, and wherein:

the transmitter has a time stamp counter and a time stamp attacher which attaches the arrival time of a cell to that cell as a time stamp according to the output of the time stamp counter; and the receiver has a time stamp counter which generates the same timing as the time stamp counter of the transmitter, and a time stamp detector for detecting the time stamps of cells stored in the receiving buffers; and the receiving buffer read controller has a reading element which reads cells stored in the receiving buffers according to the time stamps on the basis of the time stamp counter of the receiver.

5. An asynchronous transfer mode ("ATM") cell transport system in a wireless communication system, comprising:

a transmitter for transmitting cells; and a receiver for receiving cells classified into quality classes according to transmission quality requirements;

wherein the transmitter comprises:

a transmission cell demultiplexer to distribute cells according to their quality class;

transmission buffers each of which distinguishes and stores cells that have been distributed by the transmission cell demultiplexer; and a transmission buffer read controller which reads cells stored in the transmission buffers starting from cells with a high priority as determined by the quality class thereof; and wherein the receiver comprises:

receiving buffers which store received cells; and a receiving buffer read controller which reads cells from the receiving buffers starting from cells with the high priority;

wherein the receiver includes a receiving cell demultiplexer to distribute received cells in accordance with the quality class thereof, and the receiving buffers each distinguish and store cells that have been distributed by the receiving cell demultiplexer, and An asynchronous transfer mode ("ATM") cell transport system in a wireless communication system, comprising:
a transmitter for transmitting cells; and
a receiver for receiving cells classified into quality classes according to transmission quality requirements;
wherein the transmitter comprises:
a transmission cell demultiplexer to distribute cells according to their quality class;
transmission buffers each of which distinguishes and stores cells that have been distributed by the transmission cell demultiplexer; and
a transmission buffer read controller which reads cells stored in the transmission buffers starting from cells with a high priority as determined by the quality class thereof; and wherein the receiver comprises:
receiving buffers which store received cells; and
a receiving buffer read controller which reads cells from the receiving buffers starting from cells with the high priority;
wherein the receiver includes a receiving cell demultiplexer to distribute received cells in accordance with the quality class thereof, and the receiving buffers each distinguish and store cells that have been distributed by the receiving cell demultiplexer,
wherein the quality classes are set to different values on each VPI and/or VCI, and at least one of the transmission cell demultiplexer and the receiving cell demultiplexer includes a table storing the quality class according to the difference values, the ATM cell transport system further comprising a distributing element which distributes cells after referring to the table, and wherein:
the transmitter has a time stamp counter and a time stamp attacher which attaches the arrival time of a cell to that cell as a time stamp according to the output of the time stamp counter;
the receiver has a time stamp counter which generates the same timing as the time stamp counter of the transmitter, and a time stamp detector for detecting the time stamps of cells stored in the receiving buffers; and
the receiving buffer read controller has a reading element which reads cells stored in the receiving buffers according to the time stamps on the basis of the time stamp counter of the receiver.

6. An asynchronous transfer mode ("ATM") cell transport system in a wireless communication system, comprising:
a transmitter for transmitting cells; and
a receiver for receiving cells classified into quality classes according to transmission quality requirements;
wherein the transmitter comprises:
a transmission cell demultiplexer to distribute cells according to their quality class;
transmission buffers each of which distinguishes and stores cells that have been distributed by the transmission cell demultiplexer; and
a transmission buffer read controller which reads cells stored in the transmission buffers starting from cells with a high priority as determined by the quality class thereof; and wherein the receiver comprises:
receiving buffers which store received cells; and
a receiving buffer read controller which reads cells from the receiving buffers starting from cells with the high priority;
wherein the receiver includes a receiving cell demultiplexer to distribute received cells in accordance with the quality class thereof, and the receiving buffers each distinguish and store cells that have been distributed by the receiving cell demultiplexer, and
wherein the quality classes are set to different values on each VPI and or VCI, the transmission cell demultiplexer further comprising:
a table storing the quality class according to the different values;
a first distributing element which distributes cells after referring to the table; and
an element which attaches an identifier indicating the quality class to a distributed cell, the receiving cell demultiplexer further comprising a distributing element which distributes cells according to the identifiers of the received cells,
wherein:
the transmitter has a time stamp counter and a time stamp attacher which attaches the arrival time of a cell to that cell as a time stamp according to the output of the time stamp counter;
the receiver has a time stamp counter which generates the same timing as the time stamp counter of the transmitter, and a time stamp detector for detecting the time stamps of cells stored in the receiving buffers; and
the receiving buffer read controller has a reading element which reads cells stored in the receiving buffers according to the time stamps on the basis of the time stamp counter of the receiver.

7. An asynchronous transfer mode ("ATM") cell transport system in a wireless communication system, comprising:
a transmitter for transmitting cells; and
a receiver for receiving cells classified into quality classes according to transmission quality requirements;
wherein the transmitter comprises:
a transmission of cell demultiplexer to distribute cells according to their quality class;
transmission buffers each of which distinguishes and stores cells that have been distributed by the transmission cell demultiplexer; and
a transmission buffer read controller which reads cells stored in the transmission buffers starting from cells with a high priority as determined by the quality class thereof; and wherein the receiver comprises:
receiving buffers which store received cells; and
a receiving buffer read controller which reads cells from the receiving buffers starting from cells with the high priority,
wherein the receiver includes a receiving cell demultiplexer to distribute received cells in accordance with the quality class thereof, and the receiving buffers each distinguish and store cells that have been distributed by the receiving cell demultiplexer, and
wherein:
the receiver has a time stamp counter and time stamp detector for detecting the time stamps of cells stored in the receiving buffers, and the receiving buffer read controller has means for reading cells stored in the receiving buffers according to the time stamps on the basis of the time stamp counter in the receiver; and
the transmitter has a time stamp counter which generates the same timing as the time stamp counter of the receiver, and a time stamp attacher which attaches the arrival time of a cell to that cell as a time stamp according to the output of the time stamp counter of the transmitter.

8. An asynchronous transfer mode ("ATM") cell transport system in a wireless communication system, comprising:
a transmitter for transmitting cells; and
a receiver for receiving cells classified into quality classes according to transmission quality requirements;
wherein the transmitter comprises:
a transmission of cell demultiplexer to distribute cells according to their quality class;
transmission buffers each of which distinguishes and stores cells that have been distributed by the transmission cell demultiplexer; and
a transmission buffer read controller which reads cells stored in the transmission buffers starting from cells with a high priority as determined by the quality class thereof; and wherein the receiver comprises:
receiving buffers which store received cells; and
a receiving buffer read controller which reads cells from the receiving buffers starting from cells with the high priority,
wherein the receiver includes a receiving cell demultiplexer to distribute received cells in accordance with the quality class thereof, and the receiving buffers each distinguish and store cells that have been distributed by the receiving cell demultiplexer, and
wherein the quality classes are set to different values on each VPI and/or VCI, and at least one of the transmission cell demultiplexer and the receiving cell demultiplexer includes a table storing the quality class according to the difference values, the ATM cell transport system further comprising a distributing element which distributes cells after referring to the table, and
the receiver has a time stamp counter and a time stamp detector for detecting the time stamps of cells stored in the receiving buffers, and the receiving buffer read controller has means for reading cells stored in the receiving buffers according to the time stamps on the basis of the time stamp counter in the receiver; and
the transmitter has a time stamp counter which generates the same timing as the time stamp counter of the receiver, and a time stamp attacher which attaches the arrival time of a cell to that cell as a time stamp according to the output of the time stamp counter of the transmitter.

9. An asynchronous transfer mode ("ATM") cell transport system in a wireless communication system, comprising:
a transmitter for transmitting cells; and
a receiver for receiving cells classified into quality classes according to transmission quality requirements;
wherein the transmitter comprises:
a transmission cell demultiplexer to distribute cells according to their quality class;
transmission buffers each of which distinguishes and stores cells that have been distributed by the transmission cell demultiplexer; and
a transmission buffer read controller which reads cells stored in the transmission buffers starting from cells with a high priority as determined by the quality class thereof; and wherein the receiver comprises:
receiving buffers which store received cells; and
a receiving buffer read controller which reads cells from the receiving buffers starting from cells with the high priority;
wherein the receiver includes a receiving cell demultiplexer to distribute received cells in accordance with the quality class thereof, and the receiving buffers each distinguish and store cells that have been distributed by the receiving cell demultiplexer, and
wherein the quality classes are set to different values on each VPI and/or VCI, the transmission cell demultiplexer further comprising:
a table storing the quality class according to the different values;
a first distributing element which distributes cells after referring to the table;
an element which attaches an identifier indicating the quality class to a distributed cell, the receiving cell demultiplexer further comprising a distributing element which distributes cells according to the identifiers of the received cells, and
wherein:
the receiver has a time stamp counter and a time stamp detector for detecting the time stamps of cells stored in the receiving buffers, and the receiving buffer read controller has a reading element which reads cells stored in the receiving buffers according to the time stamps on the basis of the time stamp counter in the receive; and
the transmitter has a time stamp counter which generates the same timing as the time stamp counter of the receiver, and a time stamp attacher which attaches the arrival time of a cell to that cell as a time stamp according to the output of the time stamp counter of the transmitter.

\* \* \* \* \*